Patented June 29, 1937

2,085,512

UNITED STATES PATENT OFFICE 2,085,512

MANUFACTURE OF COLOR MASTER MATERIALS

George Schneider, Montclair, N. J., assignor to Celanese Corporation of America, a corporation of Delaware No Drawing. Application October 20, 1934, Serial No. 749,180

5 Claims. (Cl. 106—40)

This invention relates to the manufacture of compositions of matter suitable for coloring and/or increasing the covering power of filaments, yarns, films, articles, etc. made of or containing plastic materials such as derivatives of cellulose.

An object of the invention is the economic and expeditious production of pigmented material and the addition of same to yarns, filaments, films, lacquers, articles, etc. made of or containing derivatives of cellulose. Another object of the invention is the preparation of color master batches in organic derivative of cellulose wherein the pigment coloring material is evenly dispersed in the organic derivative of cellulose and does not form, in working and handling, agglomerates or grit. Other objects of the invention will appear from the following detailed description.

It previously has been proposed to incorporate white or colored pigment-like material in spinning solutions in order to produce artificial yarns of subdued lustre, increased opacity and/or color. In commercial processes involving the use of such pigments, it was necessary to subject the pigments to prolonged and elaborate grinding processes in order to attain the degree of subdivision necessary to prevent clogging of the fine orifices of the spinning jets and to avoid reducing the strength of the resulting filaments to an undue extent. However, even after such prolonged grinding, the size of the pigment particles was not reduced to as great a degree as is often desired.

It also previously has been proposed to form a color master material or "lacquer chip" material by dispersing an amount of concentrated pigment in an organic derivative of cellulose while the organic derivative of cellulose was dissolved in a solvent, then adding this material to a spinning solution in a quantity sufficient to lend the desired amount of pigment thereto. This method has many advantages over the direct addition of pigment to the spinning solution in that it is possible by this method to obtain very satisfactory pigment particle size and fair dispersions of the pigment in the resulting product.

I have now found that by preparing the color master material in a special way, that even better dispersions and particle size may be obtained. By employing this invention, a color master material may be formed that is stable and does not form agglomerates or lumps upon standing or being handled. Further, there is a more complete conversion of the material which results in a better color and stronger filaments accompanied by more easy and evener distribution of the color master material in solutions of organic derivatives of cellulose or other film or filament forming solutions.

In accordance with my invention, I form a color master material in an organic derivative of cellulose by mixing and working the pigments in the presence of an oil and a solvent or solvent mixture for the organic derivative of cellulose in amounts and a manner to produce the desired results, then drying the material until the same contains but a small amount of residual solvent. To color master material so prepared may be added plastic material or solutions of same in amounts sufficient to give the desired color and/or opacity to the final product. Thus, the color master material may be added to a solution of organic derivative of cellulose in suitable solvents in such amounts that there is from .1 to 50% of pigment based on the weight of the organic derivative of cellulose present, and the solution may then be spun into filaments or formed into films, foils, sheets or other articles. Examples of organic derivative of cellulose are the organic esters of cellulose and cellulose ethers. Examples of organic esters of cellulose are cellulose acetate, cellulose formate, cellulose propionate and cellulose butyrate, while examples of cellulose ethers are methyl cellulose, ethyl cellulose and benzyl cellulose. The color master material may also be added to solutions of synthetic or natural resins with or without the presence of derivatives of cellulose such as nitrocellulose and cellulose acetate.

The color master material is formed by adding a pigment to an organic derivative of cellulose. This pigment may be white to obtain subdued lustre and increased opacity. Examples of white inorganic pigments are tin oxide, tin phosphate, antimony oxide, titanium dioxide, barium sulfate, lead sulfate, calcium sulfate, zinc oxide, zinc carbonate, aluminum oxide, silicon dioxide, barium borate, calcium borate or silicates such as china clay or other clays, talc or mica. The pigment may be of an organic nature, such as diacetyl benzidine, diacetyl toluidine, dibenzoyl benzidine, naphthyl urea, anthraquinone, anthracene or suitable synthetic or natural resins.

This invention is of particular interest for the preparation of colored filaments, films, foils, sheets and articles, in which case the color master material contains a colored inorganic or organic pigment of a quantity and/or mixture to produce the desired color or shade. For a yellow color, ochre, sienna, chrome yellow, tin bronze, etc. may be employed. For a red color, Venetian red, red lead, vermilion, etc. may be employed. For a blue color, ultra-marine, Prussian blue, Milori blue, etc. may be used. For green, Guignet's green, verdigris, chrome green, etc. may be employed. For a brown color, raw ombre, burnt ombre, Vandyke brown, etc. may be used. For black, lamp black, carbon black, graphite or other black pigment may be used, which may or may not be toned with iron gallate or other toners to obtain jet blacks. To obtain any other colors, the pigments may be mixed as is well understood in the paint art.

It is possible to make color master batches in cellulose acetate, etc. by introducing appreciable amounts of dry pigments into the cellulose acetate, simply by dissolving cellulose acetate in solvent and adding the pigment to the plastic mass either in a Werner Pfleiderer mixer or on malaxating rolls. In this case no plasticizer is required. The material may be worked on rolls until dry, or until the remaining solvent is dried out. The resulting lacquer chips or color master material, which may contain as much as 500 parts of pigment to 100 parts of cellulose acetate, may be dissolved and/or suitable addition may be made of cellulose acetate or other organic derivative of cellulose and other ingredients so as to obtain the desired color concentration. The mixture may be spun into filaments or cast into film or foil or otherwise processed according to the nature of the desired final material or object.

According to this invention, the best color is obtained from absolutely dry pigment and by adding an oil or oily material to the solvent for the organic derivative of cellulose. The solvent for the organic derivative of cellulose may be any suitable low boiling solvent, such as mixtures of acetone and ethyl or methyl alcohol, chloroform, ethylene dichloride, mixtures of ethylene dichloride and ethyl or methyl alcohol, mixtures of methyl chloride and ethyl or methyl alcohol. Mixtures of these solvents may be employed. When the color master material is to be formed in cellulose acetate, the preferred solvent is a mixture of acetone and anhydrous ethyl alcohol in proportions of from 50 to 70 parts of acetone to from 50 to 30 parts of anhydrous ethyl alcohol. The amount of solvent employed may vary between 50 and 100 parts of solvent for every 100 parts of organic derivative of cellulose employed.

The amount of oil or oily material that may be added to the solvent or solvent mixture is preferably between 1 to 10 parts to every 100 parts of organic derivative of cellulose that is to be employed. In employing cellulose acetate as the base material of the color master material and carbon black, preferably colloidal carbon black, as the pigment, it is preferable to employ from 2 to 5 parts of oil or oily material to each 100 parts of cellulose acetate in the resulting product. Although a low viscosity castor oil is preferred for most pigments, other oils or oily materials may be substituted for a part or all of the castor oil. Examples of other oils or oily materials that may be used are grape seed oil, China-wood oil, linseed oil, Turkey red oil, etc.

The ingredients may be mixed together in any suitable manner. Thus, the whole mixture may be placed in a Banbury-type mixer or the pigment may be added to the plastic mass of solvent and organic derivative of cellulose on the malaxating rolls. An improved and more desired color master material is formed, however, by dissolving or mixing the oil or oily material in the solvent or solvent mixture. This mixture may then be poured on top of the dry pigment that has been placed in the bottom of a Banbury-type mixer. The mixer is started and the organic derivative of cellulose added gradually so that it is continuously chewed up between the mixer blades and mixed with the pigment. Conversion takes place in about five minutes, and the mixing is continued for from 10 to 20 minutes. The batch may then be transferred to malaxating rolls, mixed, refined or pulled through thin from 3 to 8 times, remixed and taken off the rolls in as thin a sheet as consistency permits. The resulting sheets may then be dried at about 70° C. until the residual solvent is less than 5%, say 2%. The material may then be cut or broken into suitable size chips for shipping or mixing with solutions of organic derivative of cellulose or other materials.

As illustrations and not as limitations, the following examples are given:

Example I

A preferred formula is

| | Parts |
|---|---|
| Cellulose acetate (acetone soluble) | 100 |
| Carbon black (dry) | 20–50 |
| Castor oil | 2–5 |
| Acetone | 60 |
| Anhydrous ethyl alcohol | 40 |

The material may be processed as follows:

The castor oil is dissolved in the solvent mixture. The dry pigment is placed in the bottom of a Banbury-type mixer and the solvents poured on top. The mixer is started and the cellulose acetate added gradually. Conversion takes places within five minutes and the mixing is continued for about 15 minutes. The batch is transferred to malaxating rolls and mixed and worked, i. e. pulled through thin about five times, remixed and taken off the rolls in a thin sheet. The sheets are then dried at about 70° C. until residual solvent is less than 2%.

Example II

The material from Example I is cut or broken into chips and the same added to a solution of cellulose acetate in acetone in sufficient quantity to have about 3% carbon black present, the amount being based on the weight of the combined cellulose acetate. The solution thus formed is filtered and forced through fine orifices into an evaporative atmosphere in a manner normally employed in forming yarns for textile purposes. The resulting filaments are black and of even color, while their strength is substantially that of unpigmented filaments.

Although one may incorporate as much color or pigment as 500 parts to every 100 parts of organic derivative of cellulose, it is preferable to use smaller amounts, say from 20 to 50 parts especially when dealing with pigments having a particle size of less than 0.2 micron and having a specific gravity of about that of carbon black. Higher concentrations of pigment do not provide sufficient space in the external phase medium for complete dispersion of individual particles so that each particle is surrounded by a film of the external phase medium, in this particular case, the organic derivative of cellulose. If complete dispersion is not obtained and the pigment occurs in the form of agglomerates and grit the resulting filament, film or foil will have a grayish color when employing black pigment, and an off shade when employing other colors. Also, if the concentration of pigment is very high, there may be reversal, during processing, of phases so that the organic derivative of cellulose becomes dispersed in the pigment instead of vice versa.

If the particle size of the pigment is larger than 0.2 micron or the specific gravity of the pigment is considerably greater than carbon black, then more than 50 parts of pigment may be employed for every 100 parts of organic derivative of cellulose. Thus, in employing titanium oxide as the pigment, amounts of 100 parts to every 100 parts of organic derivative of cellulose may be employed.

By the term "color master material" employed in the claims is meant a substantially solid pigmented composition adapted to be incorporated in plastics, lacquers, solutions to be employed for the production of sheets, films, foils and filaments, and like materials for the purpose of producing an effect therein.

It is to be understood that the foregoing detailed description is merely given by way of illustration and many alterations may be made therein without departing from the spirit of my invention.

Having described my invention, what I desire to secure by Letters Patent is:

1. Method of manufacturing color master materials containing an organic derivative of cellulose and a pigment, which comprises dissolving an oil, in an amount equal to from 1 to 10% of the organic derivative of cellulose present, in a medium which is a solvent for the organic derivative of cellulose, mixing the resulting solution with dry pigment, adding the organic derivative of cellulose to the mixture of pigment and solution of oil and mixing the same together, and then working the resultant plastic mass between rolls until substantially all of the solvent is removed and the particle size of the pigment is reduced.

2. Method of manufacturing color master materials containing cellulose acetate and a pigment, which comprises dissolving an oil, in an amount equal to from 1 to 10% of cellulose acetate present, in a medium which is a solvent for the cellulose acetate, mixing the resulting solution with dry pigment, adding the cellulose acetate to the mixture of pigment and solution of oil and mixing the same together, and then working the resultant plastic mass between rolls until substantially all of the solvent is removed and the particle size of the pigment is reduced.

3. Method of manufacturing color master materials containing cellulose acetate and carbon black, which comprises dissolving castor oil, in an amount equal to from 2 to 5% based on the weight of the cellulose acetate present, in a solvent medium containing acetone and anhydrous ethyl alcohol, mixing the resulting solution with dry carbon black, adding cellulose acetate to the mixture of carbon black and the castor oil solution, and then working the resultant plastic mass between rolls until substantially all of the solvent medium is removed and the particle size of the pigment is reduced.

4. A color master material containing a pigment, an organic derivative of cellulose, and an oil in an amount equal to from 1 to 10% based on the weight of the organic derivative of cellulose present, said material being produced by dispersing dry pigment in a medium containing a solvent for the organic derivative of cellulose and the oil, adding the organic derivative of cellulose to the mixture containing the pigment, the solvent medium and the oil, and working the resultant plastic mass between rolls until substantially all of the solvent is removed and the particle size of the pigment is reduced.

5. A yarn or filament containing an organic derivative of cellulose, a coloring material, and an oil in an amount equal to from 1 to 10% based on the weight of the organic derivatives of cellulose present, said coloring material being formed by dispersing dry pigment in a medium containing a solvent for the organic derivative of cellulose and the oil, adding the organic derivative of cellulose to the mixture containing the pigment, the solvent medium, and the oil, and working the resultant plastic mass between rolls until substantially all of the solvent is removed and the particle size of the pigment is reduced.

GEORGE SCHNEIDER.